July 5, 1955

J. W. LITTON ET AL 2,712,636

SHORT CIRCUIT ELIMINATOR

Filed April 12, 1945

INVENTORS.
James W. Litton
Roland F. Krueger

BY Robert A. Lavender

Attorney

United States Patent Office 2,712,636
Patented July 5, 1955

2,712,636
SHORT CIRCUIT ELIMINATOR

James W. Litton and Roland F. Krueger, Oak Ridge, Tenn., assignors, by mesne assignments, to the United States of America as represented by the United States Atomic Energy Commission Application April 12, 1945, Serial No. 588,062

2 Claims. (Cl. 324—158)

This invention relates to current measuring, and has for its principle object the provision of an arrangement and method for preserving or bringing about the veracity of meter readings in two or more circuits subject to localized cross currents of unknown and unpredictable magnitudes.

A particular object of the invention is to make possible continued reliable operation of an electromagnetic isotope separator after a partial short arises between the deionizing electrodes the deionizing currents to which are relied upon for governing the operation of the separating apparatus.

Figure 1:
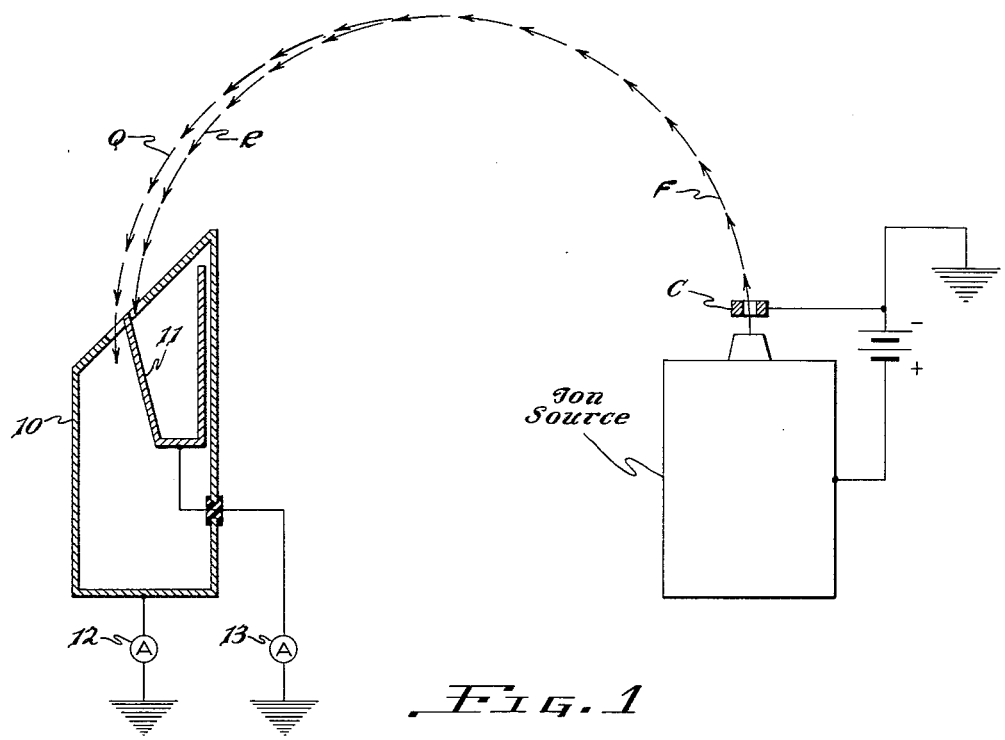
Figure 2:
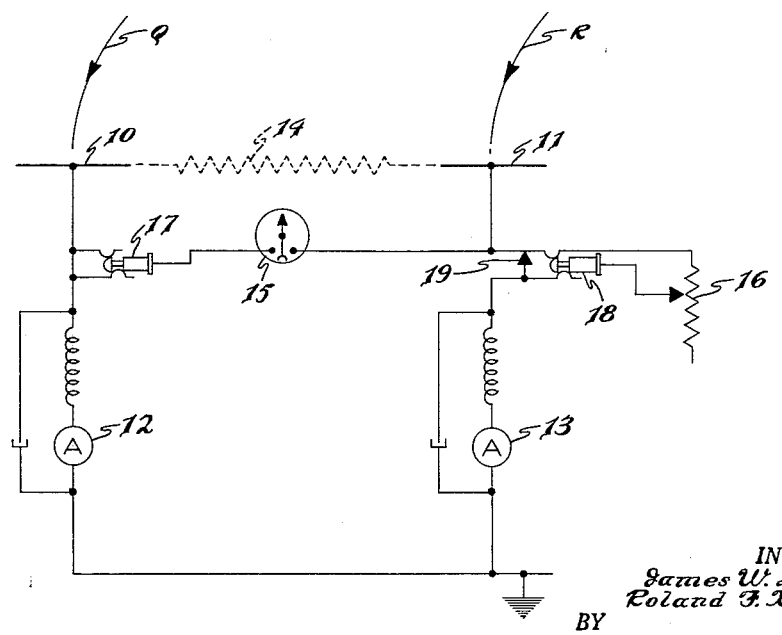

Other objects and advantages of the invention will become evident from the following description when read in connection with the accompanying drawing in which:

Fig. 1 is a conventionalized schematic showing of an isotope separator incorporating the invention and Fig. 2 is a circuit diagram showing in more detail an embodiment of the invention incorporated in the apparatus shown in Fig. 1.

Those parts of isotope separation apparatus necessary for understanding this embodiment of the invention are shown in Fig. 1 as comprising a source of positive ions of the isotopes to be separated, and an accelerating electrode C to form a stream of ions F. It is to be understood that the apparatus shown is enclosed in a chamber exhausted to a greatly reduced pressure and subjected to a strong magnetic field the lines of force of which are perpendicular to the plane of the drawing. Thus, the ion stream F follows a curved path the curvature of which is a function of the mass of the ions, which, as is well known, results in a separation into fairly discrete streams composed of the various isotopes present in the stream F. In the present case only two isotopes are assumed, and these separate into streams Q and R which fall upon collectors 10 and 11, respectively, to be deionized by currents flowing to ground through suitable meters 12 and 13, respectively.

For successful separation the streams Q and R must be directed into the collectors 10 and 11 with great accuracy, and this is normally checked by the readings of the meters 12 and 13. When these readings depart from those which have been calculated or otherwise predetermined as proper, the apparatus is regulated to correct this condition. If a partial short develops between thte two collectors 10 and 11, the current readings of the meters 12 and 13 become false and operation must be terminated.

In accordance with the invention, the veracity of the meter readings is preserved in the presence of partial shorts between the collectors 10 and 11 by means of the circuit arrangement shown in Fig. 2 in which a resistance 14 indicates a partial short which brings about an abnormal distribution of the deionizing currents. The magnitude of this resistance cannot be predetermined.

By connecting a galvanometer 15 in parallel with the resistance 14 between the collectors 10 and 11, and a variable resistor 16 in series with the meter 13 which reads the less abundant isotope, here assumed to be the R isotope, the potential of the collector 11 can be raised to such a point that no current flows through the resistance 14 or the galvanometer 15. As as example, if the valvanometer 15 is a ten milliamp. meter changed to a 5–0–5 valvanometer at 2 ohms, it can be successfully employed to determine the balancing out of the resistance 14 for values as low as .01 ohm.

It will be evident that when the variable resistor 16 has been adjusted so that no current flows through the partial short represented by the resistance 14, the readings of the meters 12 and 13 correctly indicate the intensities of the ion streams falling on the corresponding collectors 10 and 11.

In the normal operation of the apparatus the galvanometer 15 and the variable resistor 16 are not plugged in. Whenever the operator has reason to believe from the observed readings of the meters 12 and 13 that a partial short exists between the collectors 10 and 11, he inserts a plug 17, as shown, to connect one side of the galvanometer 15 to the lead from the collector 10 and he also inserts a plug 18, as indicated, to open contact 19 and connect the variable resistor 16 in the lead from the collector 11. The variable resistor 16 is then adjusted until the galvanometer 15 indicates that no localized current is flowing between the collectors 10 and 11, at which time the operator is assured that the meters 12 and 13 correctly interpret the reception by the collectors 10 and 11.

While the invention has been illustrated as applied to apparatus for separating isotopes, it will be understood that it is not limited to such apparatus, and that various modifications of the invention will readily suggest themselves to persons skilled in the art without departing from the scope of the invention as set forth in the appended claims.

We claim:

1. In the electromagnetic isotope separating apparatus having two electrically isolated collecting electrodes connected through current meters to a common terminal, an adjustable resistance in the circuit between one of said electrodes and the common terminal and means comprising an electrical indicating instrument connected between the electrodes for indicating the existence of a potential difference between said electrodes, whereby the resistance may be adjusted to eliminate undesired currents between said electrodes due to partial shorts or the like.

2. In isotope separating apparatus in which positive ions of the isotopes are collected on closely adjacent electrodes, the deionizing currents from which are employed for monitoring operation of the apparatus and between which localized currents frequently exist, in combination, variable resistance means connected into the circuit of one of the deionizing currents and adjustable to vary the potential of the electrode in said one circuit, and valvanometer means connected between the electrodes to indicate when the electrodes are at equal potential as a result of adjustment of said variable resistance means.

References Cited in the file of this patent

UNITED STATES PATENTS

| | | |
|---|---|---|
| 359,739 | Powers | Mar. 22, 1887 |
| 587,698 | Brown | Aug. 10, 1897 |
| 1,213,689 | Price | Jan. 23, 1917 |
| 2,304,191 | Mott-Smith | Dec. 8, 1942 |
| 2,341,551 | Hoover, Jr. | Feb. 15, 1944 |
| 2,362,372 | Halfmann | Nov. 7, 1944 |